(12) United States Patent
Bober et al.

(10) Patent No.: US 7,658,451 B2
(45) Date of Patent: Feb. 9, 2010

(54) AIRCRAFT WHEEL GREASE RETAINER AND METHOD FOR RETROFITTING THE SAME

(75) Inventors: Matthew T. Bober, Metamora, IL (US); Kenneth Soellner, Kettering, OH (US)

(73) Assignee: Goodrich Corporation, Charlotte, NC (US)

( * ) Notice: Subject to any disclaimer, the term of this patent is extended or adjusted under 35 U.S.C. 154(b) by 215 days.

(21) Appl. No.: 11/904,947

(22) Filed: Sep. 28, 2007

(65) Prior Publication Data

US 2008/0080802 A1 Apr. 3, 2008

Related U.S. Application Data

(60) Provisional application No. 60/827,714, filed on Sep. 30, 2006.

(51) Int. Cl.
*F16C 33/78* (2006.01)
(52) U.S. Cl. .................... 301/105.1; 301/64.302; 301/64.305; 384/477; 384/544
(58) Field of Classification Search ............ 301/64.201, 301/64.202, 64.203, 64.301, 64.302, 64.303, 301/64.304, 64.305, 64.306, 105.1, 110.6; 295/20, 21, 22, 35, 37; 384/484, 485, 477, 384/544, 589; 277/402; 184/5.1; 29/898.01, 29/898.04, 898.1, 898.11
See application file for complete search history.

(56) References Cited

U.S. PATENT DOCUMENTS

| | | | | |
|---|---|---|---|---|
| 2,028,207 A | * | 1/1936 | Hamilton | 188/336 |
| 2,173,584 A | * | 9/1939 | Frank | 301/6.2 |
| 2,617,698 A | * | 11/1952 | Gaines | 384/482 |
| 2,683,066 A | * | 7/1954 | Pusey | 384/494 |
| 2,706,135 A | * | 4/1955 | Douglas et al. | 301/64.303 |
| 2,818,302 A | * | 12/1957 | Black, Jr. | 301/64.303 |
| 2,840,421 A | * | 6/1958 | Paul | 301/64.303 |
| 2,990,216 A | * | 6/1961 | Albright et al. | 301/6.1 |
| 2,998,282 A | * | 8/1961 | Moyer | 301/6.1 |
| 3,357,747 A | * | 12/1967 | Eldred | 301/64.706 |
| 3,551,980 A | * | 1/1971 | Davis | 29/891.1 |
| 3,722,966 A | * | 3/1973 | Woodling | 384/489 |
| 3,871,709 A | * | 3/1975 | Eaton | 301/64.304 |
| 4,039,229 A | * | 8/1977 | Ohlberg | 384/471 |
| 5,344,219 A | * | 9/1994 | Adrian et al. | 301/64.102 |
| 5,658,053 A | * | 8/1997 | Vencill et al. | 301/105.1 |
| 6,200,037 B1 | * | 3/2001 | Braun | 384/466 |
| 6,533,363 B1 | * | 3/2003 | Hayes et al. | 301/105.1 |
| 6,869,080 B2 | * | 3/2005 | Janoff et al. | 277/603 |

* cited by examiner

*Primary Examiner*—Russell D Stormer
(74) *Attorney, Agent, or Firm*—Snell & Wilmer L.L.P.

(57) ABSTRACT

An aircraft wheel grease retainer for use in a wheel assembly having an axis of rotation, and further having bearings which are each located in a bearing cavity, wherein the bearing uses grease, which is introduced into the bearing cavity, wherein the wheel assembly is comprised of an outer wheel half assembly, and an inner wheel half assembly, wherein the grease retainer comprises a cylindrical retaining structure which spans from the bearings on the outer wheel half assembly to the bearings on the inner wheel half assembly, and two pliable interface rings. The cylindrical retaining structure has a centerline which corresponds to the wheel assembly axis of rotation, and further has an outer end and an opposing inner end, with a corresponding outer retaining flange and inner retaining flange which extend over the bearing cavities. The pliable interface rings seat on the cylindrical retaining structure, and interface between the cylindrical retaining structure and the wheel assembly.

13 Claims, 6 Drawing Sheets

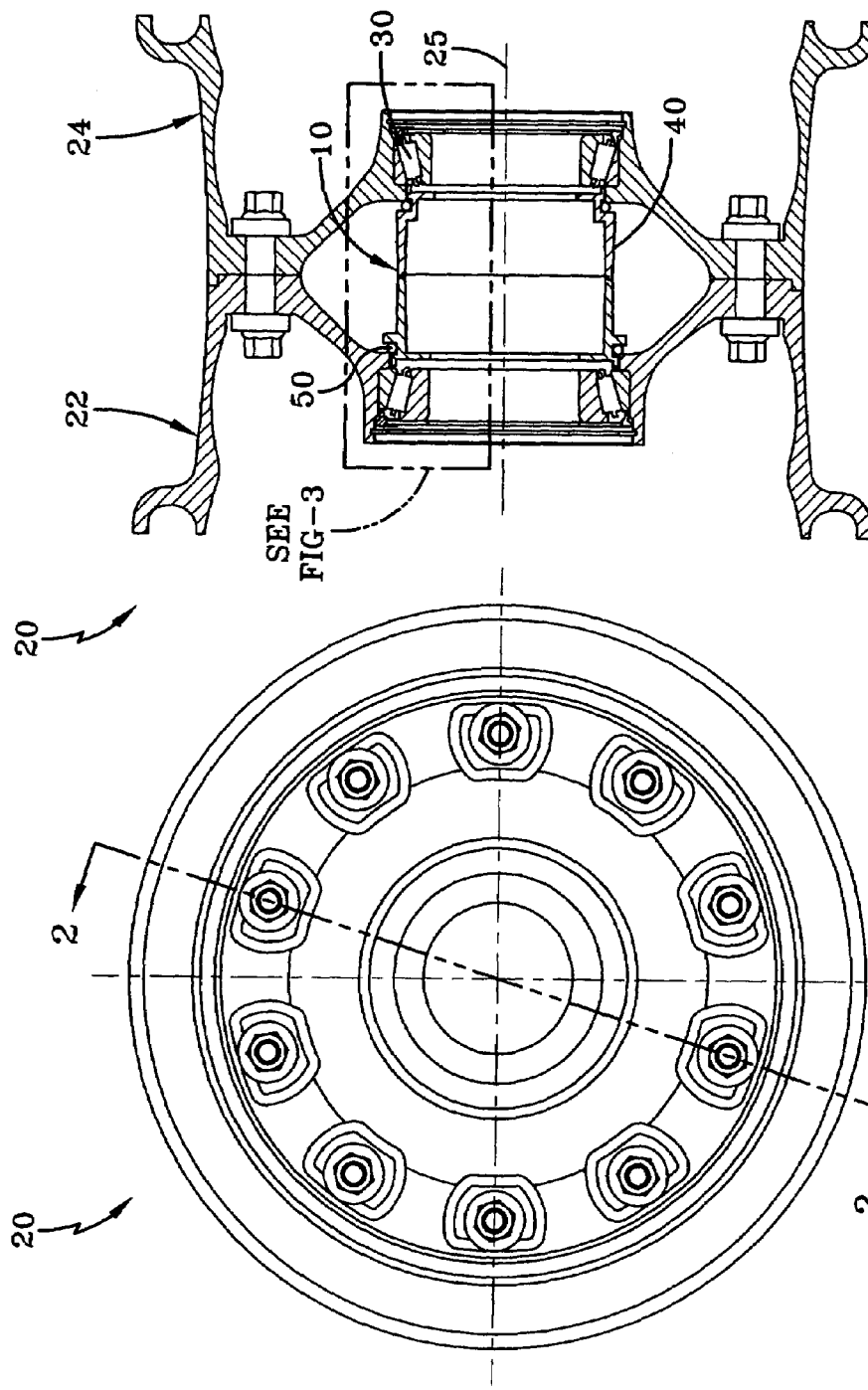

AIRCRAFT WHEEL GREASE RETAINER AND METHOD FOR RETROFITTING THE SAME

This application claims the benefit of U.S. Provisional Application No. 60/827,714, filed Sep. 30, 2006.

BACKGROUND

The present invention is in the field of aircraft wheel systems. More specifically this invention relates to a grease retention system for an aircraft wheel assembly.

Aircraft wheel systems rely on bearings. Bearings rely on adequate grease amounts to continue performance to a desired level. If a bearing loses too much grease, a bearing failure may occur. Typically bearings lose grease during use by migration caused by centrifugal forces, and other forces during wheel operation. This loss of grease may jeopardize aircraft safety, cause unscheduled removals, and cause other aircraft component damage, and reduce the useful life of the bearings.

Grease retainers have been used in the past to contain the grease in the bearings and prevent migration. These retainers were typically elastomeric rings, one each for each half of the wheel assembly. The wheel assembly would require a machined groove and sufficient grease retainer register width for this retaining ring to seat in and maintain its correctly installed position. Thus existing wheel assemblies without this machined groove can not accept such retaining rings, and wheel assemblies without sufficient grease retainer register width cannot be machined to add the required groove to accept such retaining rings.

A grease retainer is desired which would not require machining of the wheel assembly retaining ring groove, thus reducing costs on initial manufacture, and allow for incorporating grease retainers on existing wheel assemblies without requiring retrofit machining of the wheel assembly retaining ring groove, thus reducing retrofit costs on existing wheel assemblies. A grease retainer is desired that also permits the incorporation of grease retainers on existing wheel assemblies that do not have sufficient grease retainer register width to accommodate a retaining ring groove.

SUMMARY

An aircraft wheel grease retainer for use in a wheel assembly having an axis of rotation, and further having bearings which are each located in a bearing cavity, wherein the bearing uses grease, which is introduced into the bearing cavity, wherein the wheel assembly is comprised of an outer wheel half assembly, and an inner wheel half assembly, wherein the grease retainer comprises a cylindrical retaining structure which spans from the bearings on the outer wheel half assembly to the bearings on the inner wheel half assembly, and two pliable interface rings. The cylindrical retaining structure has a centerline which corresponds to the wheel assembly axis of rotation, and further has an outer end and an opposing inner end, with a corresponding outer retaining flange and inner retaining flange which extend over the bearing cavities. The pliable interface rings seat on the cylindrical retaining structure, and interface between said cylindrical retaining structure and the wheel assembly.

BRIEF DESCRIPTION OF DRAWINGS

FIG. 1 is a side view of a wheel assembly according to an aspect of the invention.

FIG. 2 is a cross sectional view of a wheel assembly according to an aspect of the invention, taken from FIG. 1.

DETAILED DESCRIPTION

Various aspects of the invention are presented in FIGS. 1-8 which are not drawn to scale and in which like components are numbered alike.

Figure 9:
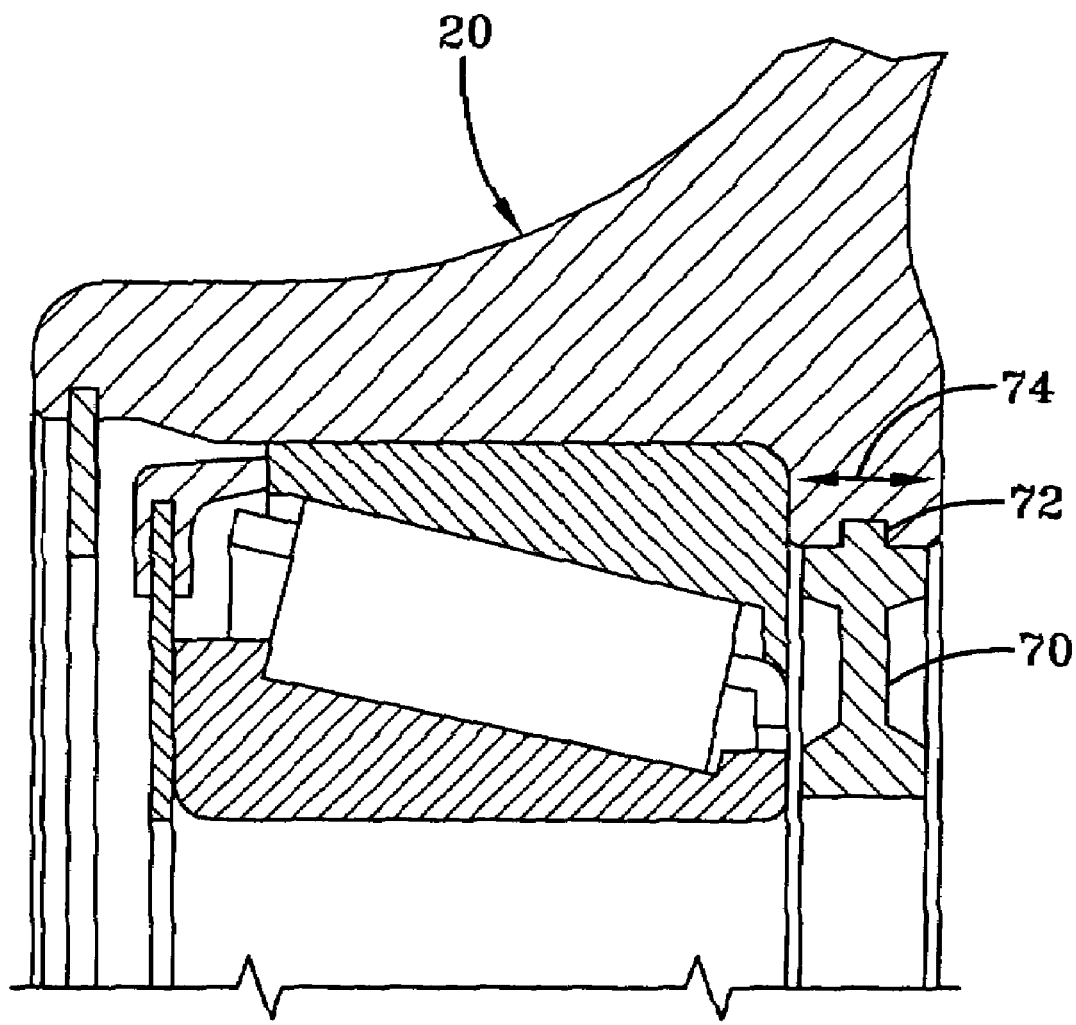
FIG. 9 is a detailed cross sectional view of a portion of a prior art wheel assembly with grease retainer ring.

A typical prior art grease retainer ring is shown in FIG. 9. The retainer ring 70 is fitted into the groove 72 which must be machined into the wheel assembly 20. This groove 72 and the retaining ring 70 fit within the register width 74.

Referring now to FIGS. 1-8, according to an aspect of the invention, a wheel assembly 20 is shown.

A typical wheel assembly comprises an inner wheel half assembly 22 and an outer wheel half assembly 24. These wheel halves are then attached to each other typically by bolts and nuts, forming the wheel assembly 20. The wheel assembly 20 has an axis of rotation 25. The wheel assembly also has a bearing 30 installed in each wheel half, located in a bearing cavity 32. These bearings 30 require grease for proper functioning.

According to an aspect of the invention, an aircraft wheel grease retainer 10 for use in a wheel assembly 20 comprises a cylindrical retaining structure 40 and pliable interface rings 50. In a preferred embodiment of the invention, these rings are O-rings. In a further preferred embodiment, these O-rings are made of resilient, preferably elastomeric material that is chemically compatible with bearing grease.

The cylindrical retaining structure 40 spans from the bearing 30 on the outer wheel half assembly 24 to the bearing 30 on the inner wheel half assembly 22. The cylindrical retaining structure 40 has a centerline 45 which, when installed in the wheel assembly 20 corresponds to the wheel assembly axis of rotation 25. The cylindrical retaining structure 40 has an outer end 44 and an opposing inner end 42, and further has an outer retaining flange 48 on the outer end 44 and an inner retaining flange 46 on the inner end 42. These flanges extend radially inwardly over the bearing 30 on the corresponding wheel assembly half.

The pliable interface rings 50 seat on the cylindrical retaining structure 40, and interface between the cylindrical retaining structure 40 and the wheel assembly 20.

The cylindrical retaining structure 40 may be molded or machined in one piece. However, it may be more economical to mold the retaining structure in two halves. According to an aspect of the invention, the cylindrical retaining structure 40 is comprised of an outer portion 43 and an inner portion 41, wherein the outer portion 43 corresponds to the outer wheel half assembly 24, and the inner portion 41 corresponds to the inner wheel half assembly 22. The outer portion 43 and the inner portion 41 may then be joined before installation. This is how it is shown in FIGS. 1-8. According to a preferred embodiment, the cylindrical retaining structure 40 is molded of a plastic, in two pieces, an inner portion 41 and outer portion 43, and then the two pieces are fuse welded together forming a one piece cylindrical retaining structure.

Figure 3:
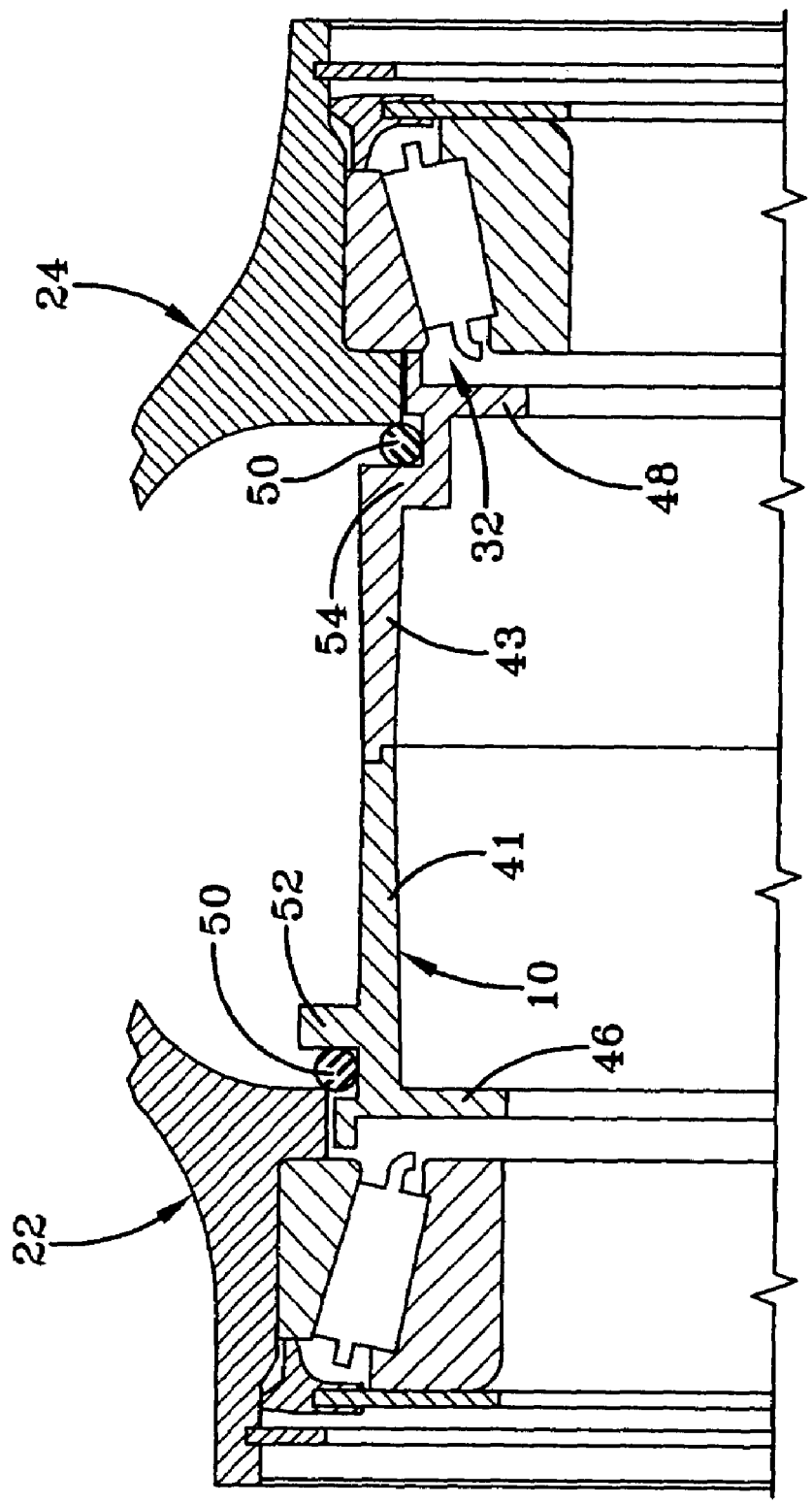
FIG. 3 is a detailed cross sectional view of a portion of a wheel assembly according to an aspect of the invention, taken from FIG. 2.
Figure 5:
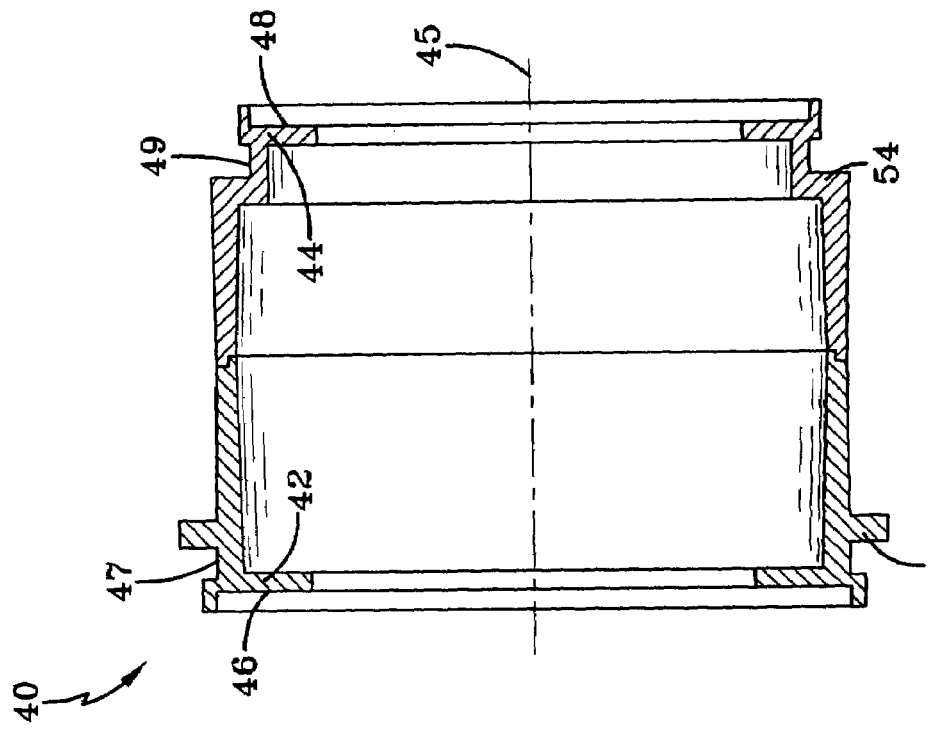
FIG. 5 is a cross sectional view of a cylindrical retaining structure according to an aspect of the invention.
Figure 4:
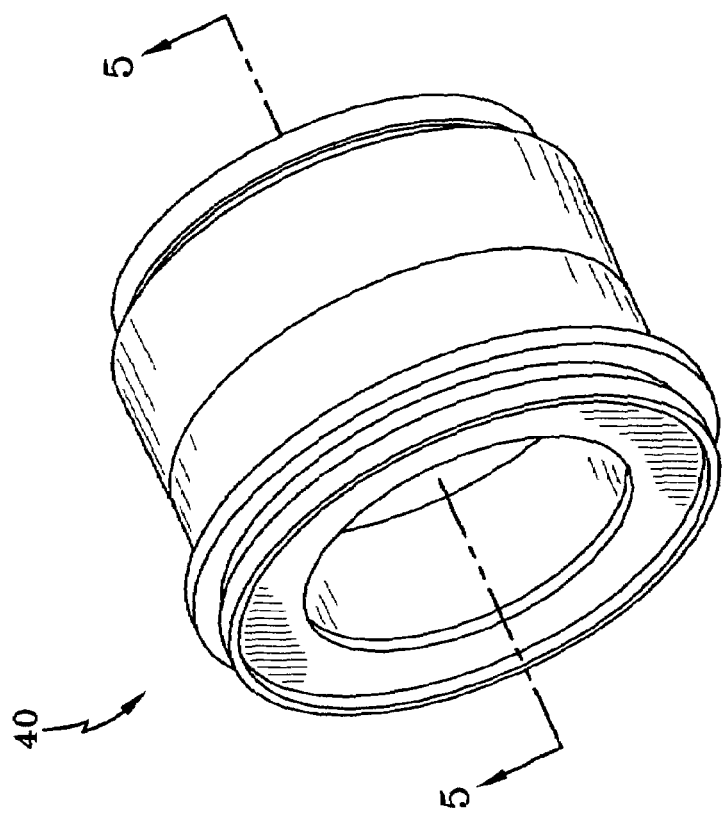
FIG. 4 is an isometric view of a cylindrical retaining structure according to an aspect of the invention.
Figure 6:
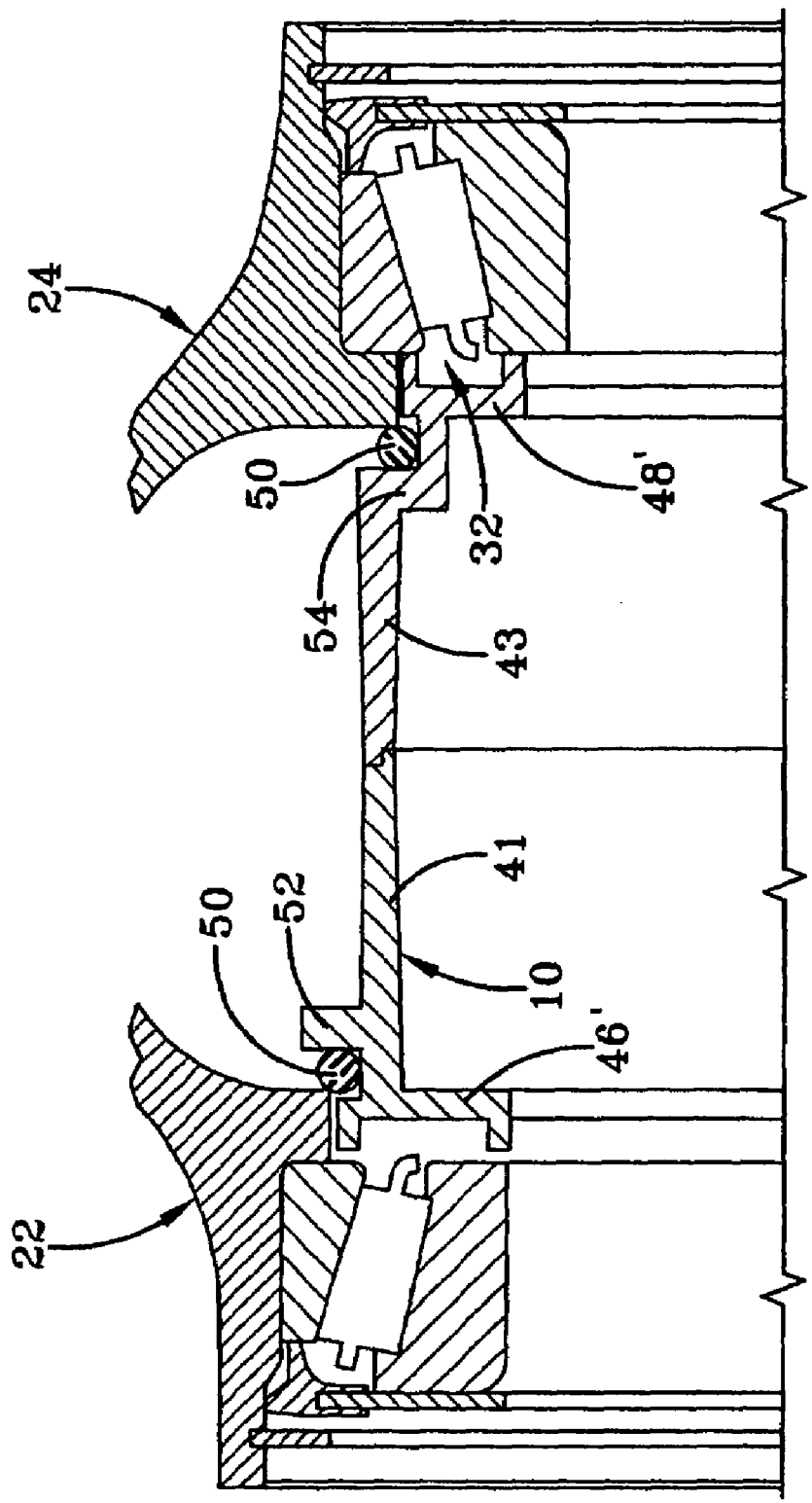
FIG. 6 is a detailed cross sectional view of a portion of a wheel assembly according to an aspect of the invention, taken from FIG. 2.
Figure 8:
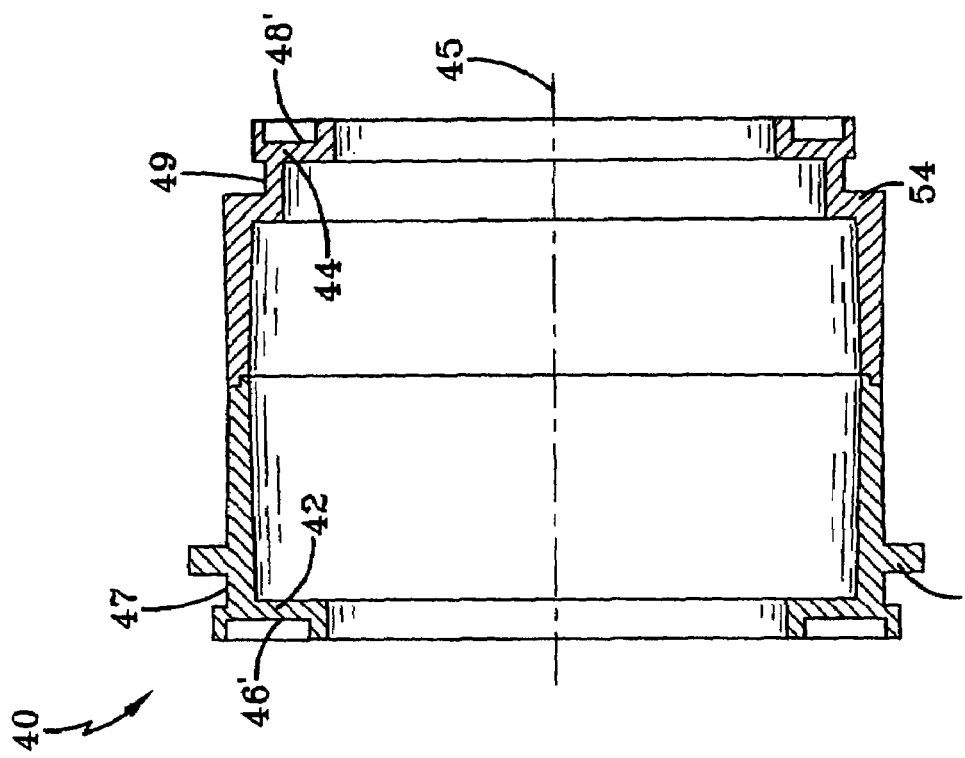
FIG. 8 is a cross sectional view of a cylindrical retaining structure according to an aspect of the invention.
Figure 7:
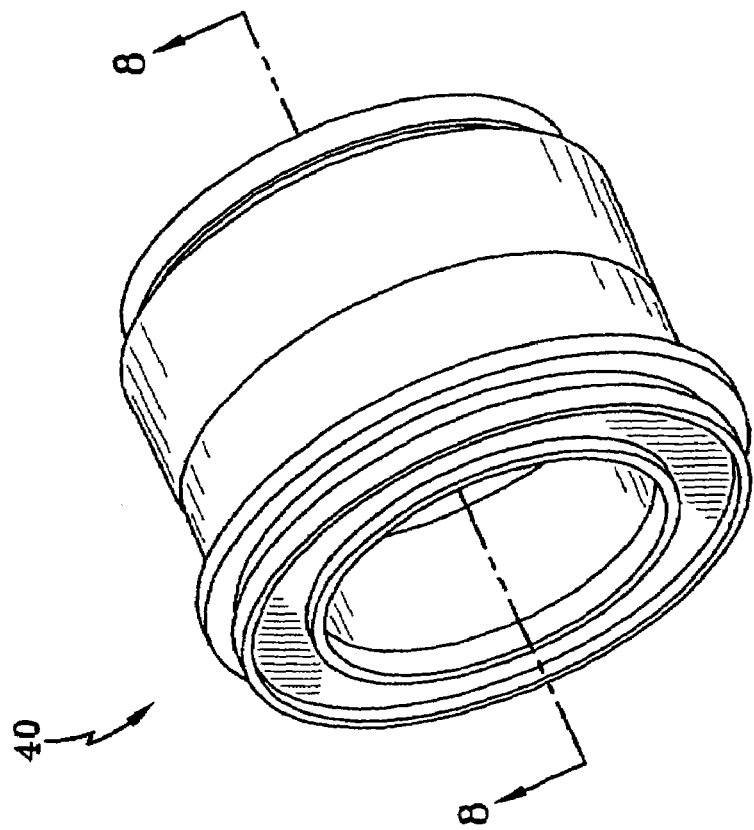
FIG. 7 is an isometric view of a cylindrical retaining structure according to an aspect of the invention.

According to a further aspect of the invention, the outer retaining flange 48' and the inner retaining flange 46' are C-shaped to provide a cavity reservoir for the grease. This embodiment is shown in FIGS. 6-8. According to an alternative embodiment, shown in FIGS. 3-5, the outer retaining flange 48 and the inner retaining flange 46 are L-shaped. This functions much the same, but reduces manufacturing costs.

In a further embodiment of the invention, the cylindrical retaining structure 40 further comprises an inner pliable interface ring seat 47 on the inner end 42, and an outer pliable interface ring seat 49 on the outer end 44.

In a preferred embodiment of the invention, the inner pliable interface rings seat 47 and the outer pliable interface rings seat 49 are comprised respectively of an inner pliable interface ring flange 46, 46' and an outer pliable interface ring flange 48, 48' which each extend relatively perpendicularly to the cylindrical retaining structure centerline 45, and which is spaced such as to provide a compression fit for the pliable interface rings 50 between the pliable interface ring flanges 52/54 and the wheel assembly 20. The fit between the pliable interface ring flange and the wheel assembly is sufficient to prevent migration of grease past the O-ring, and maintains the grease retainer in the proper installed position with respect to the bearing cavities and to the wheel assembly axis of rotation.

Many wheel assemblies already in use do not have a grease retainer, thus the wheel bearings are subject to the disadvantages discussed above from losing grease during operation. Prior to this invention, retrofitting a wheel assembly would be too expensive to consider doing, as the wheel would have to be disassembled, and a groove machined into each of the wheel halves. This is not at all practical, and therefore is not done. Some existing wheel assemblies do not have sufficient register width to accommodate a retaining ring groove. In these cases, retrofitting the wheel assembly to use a traditional grease retainer is not only cost prohibitive, but it is also geometrically prohibitive. The wheel assembly cannot physically accommodate the required grooves.

According to an aspect of the invention, a method for retrofitting a wheel assembly 20 with a grease retainer 10 comprises the steps: separating the inner wheel half 22 from the outer wheel half 24; placing two pliable interface rings 50 on a cylindrical retaining structure 40, placing the cylindrical retaining structure 40 on either the inner wheel half 22 or the outer wheel half 24; and re-assembling the inner wheel half 22 to the outer wheel half 24 such that the cylindrical retaining structure 40 spans between the bearings 30.

The cylindrical retaining structure 40 is of a size and shape such that when the wheel assembly 20 is assembled, the cylindrical retaining structure 40 spans from the bearings 30 on the outer wheel half assembly to the bearings 30 on the inner wheel half assembly. Further, the cylindrical retaining structure 40 has a centerline 45 which corresponds to the wheel assembly axis of rotation 25 when installed. Further, the cylindrical retaining structure 40 has an outer end 44 and an opposing inner end 42, which correspond to the wheel assembly inner half 22 and outer half 24. The cylindrical retaining structure 40 further has an outer retaining flange 48, 48' on the outer end 44, and an inner retaining flange 46, 46' on the inner end 42, each of which extend radially inward over the corresponding bearing.

The two pliable interface rings 50 are placed such that one pliable interface ring is on the cylindrical retaining structure inner end 42 and one pliable interface ring is on the cylindrical retaining structure outer end 44; and further such that the pliable interface rings 50 are interfacing between the cylindrical retaining structure 40 and the wheel assembly 20 when installed.

We claim:

1. An aircraft wheel grease retainer for use in a wheel assembly having an axis of rotation, and further having bearings which are each located in a bearing cavity, wherein the bearing requires grease, which is introduced into the bearing cavity, wherein the wheel assembly is comprised of an outer wheel half assembly, and an inner wheel half assembly, said grease retainer comprising:

a cylindrical retaining structure which spans from the bearings on the outer wheel half assembly to the bearings on the inner wheel half assembly, wherein said cylindrical retaining structure has a centerline which corresponds to the wheel assembly axis of rotation, wherein said cylindrical retaining structure has an outer end and an opposing inner end, and further wherein said cylindrical retaining structure has an outer retaining flange on said outer end and an inner retaining flange on said inner end which extend radially inward over the bearing cavities; and two pliable interface rings, wherein said pliable interface rings seat on said cylindrical retaining structure, and interface between said cylindrical retaining structure and the wheel assembly.

2. The aircraft wheel grease retainer of claim 1 wherein said cylindrical retaining structure is comprised of an outer half and an inner half, wherein said outer half corresponds to the outer wheel half assembly, and said inner half corresponds to the inner wheel half assembly.

3. The aircraft wheel grease retainer of claim 1, wherein said outer retaining flange and said inner retaining flange are C-shaped to provide a cavity reservoir for the grease.

4. The aircraft wheel grease retainer of claim 1 wherein said cylindrical retaining structure further comprises an inner pliable interface ring seat on said inner end, and an outer pliable interface ring seat on said outer end.

5. The aircraft wheel grease retainer of claim 4 wherein said inner pliable interface ring seat and said outer pliable interface ring seat are comprised respectively of an inner pliable interface ring flange and an outer pliable interface ring flange which each extend relatively perpendicularly to said cylindrical retaining structure centerline, radially outward, and which are spaced such as to provide a compression fit for said pliable interface rings between said pliable interface ring flange and the wheel assembly, sufficient to prevent migration of the grease past said pliable interface rings.

6. A method for retrofitting a wheel assembly with a grease retainer, wherein the wheel assembly has an inner wheel half and an outer wheel half, and further having bearings located around the inner wheel half and the outer wheel half, which bearings are located in bearing cavities, comprising the steps:

separating the inner wheel half from the outer wheel half;
   placing two pliable interface rings on a cylindrical retaining structure having an inner end provided with a corresponding inner flange which extends radially inward and an outer end provided with a corresponding outer flange which extends radially inward, such that one pliable interface ring is on said cylindrical retaining structure inner end and one pliable interface ring is on said cylindrical retaining structure outer end; wherein said cylindrical retaining structure is of a size and shape such that when the wheel assembly is assembled, said cylindrical retaining structure spans from the bearing cavities on the outer wheel half assembly to the bearing cavities on the inner wheel half assembly, further when said wheel assembly is assembled, said cylindrical retaining structure has a centerline which corresponds to the wheel assembly axis of rotation, placing said cylindrical retaining structure inner end on the wheel assembly inner half, such that said cylindrical retaining structure inner flange covers said bearing cavities; and re-assembling the inner wheel half to the outer wheel half, such that said pliable interface rings are interfacing between said cylindrical retaining structure and said wheel assembly.

7. The method of claim 6, wherein said outer retaining flange and said inner retaining flange are C-shaped to provide a cavity reservoir for the grease.

8. The method of claim 6 wherein said cylindrical retaining structure further comprises an inner pliable interface ring seat on said inner end, and an outer pliable interface ring seat on said outer end.

9. The method of claim 8 wherein said inner pliable interface ring seat and said outer pliable interface ring seat are comprised respectively of an inner pliable interface ring flange and an outer pliable interface ring flange which each extend relatively perpendicularly to said cylindrical retaining structure centerline, radially outward, and which are spaced such as to provide a compression fit for said pliable interface rings between said pliable interface ring flange and the wheel assembly, sufficient to prevent migration of the grease past said pliable interface rings.

10. A method for retrofitting a wheel assembly with a grease retainer, wherein the wheel assembly has an inner wheel half and an outer wheel half, and further having bearings located around the inner wheel half and the outer wheel half, which bearings are located in bearing cavities, comprising the steps:

separating the inner wheel half from the outer wheel half;

placing two pliable interface rings on a cylindrical retaining structure having an inner end provided with a corresponding inner flange which extends radially inward and an outer end provided with a corresponding outer flange which extends radially inward, such that one pliable interface ring is on said cylindrical retaining structure inner end and one pliable interface ring is on said cylindrical retaining structure outer end; wherein said cylindrical retaining structure is of a size and shape such that when the wheel assembly is assembled, said cylindrical retaining structure spans from the bearing cavities on the outer wheel half assembly to the bearing cavities on the inner wheel half assembly, further when said wheel assembly is assembled, said cylindrical retaining structure has a centerline which corresponds to the wheel assembly axis of rotation;

placing said cylindrical retaining structure outer end on the wheel assembly outer half, such that said cylindrical retaining structure outer flange covers said bearing cavities; and re-assembling the inner wheel half to the outer wheel half, such that said pliable interface rings are interfacing between said cylindrical retaining structure and said wheel assembly.

11. The method of claim 10, wherein said outer retaining flange and said inner retaining flange are C-shaped to provide a cavity reservoir for the grease.

12. The method of claim 10 wherein said cylindrical retaining structure further comprises an inner pliable interface ring seat on said inner end, and an outer pliable interface ring seat on said outer end.

13. The method of claim 12 wherein said inner pliable interface ring seat and said outer pliable interface ring seat are comprised respectively of an inner pliable interface ring flange and an outer pliable interface ring flange which each extend relatively perpendicularly to said cylindrical retaining structure centerline, radially outward, and which are spaced such as to provide a compression fit for said pliable interface rings between said pliable interface ring flange and the wheel assembly, sufficient to prevent migration of the grease past said pliable interface rings.

* * * * *